(12) United States Patent
Raisch et al.

(10) Patent No.: US 9,467,389 B2
(45) Date of Patent: *Oct. 11, 2016

(54) HANDLING LARGE FRAMES IN A VIRTUALIZED FIBRE CHANNEL OVER ETHERNET (FCOE) DATA FORWARDER

(71) Applicant: International Business Machines Corporation, Armonk, NY (US)

(72) Inventors: Christoph Raisch, Gerlingen (DE); Stefan Roscher, Stuttgart (DE); Alexander Schmidt, Schönaich (DE); Daniel Sentler, Steinenbronn (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/263,015

(22) Filed: Apr. 28, 2014

(65) Prior Publication Data

US 2015/0312161 A1    Oct. 29, 2015

(51) Int. Cl.
H04L 12/54 (2013.01)
H04L 12/863 (2013.01)
H04L 12/46 (2006.01)

(52) U.S. Cl.
CPC .......... *H04L 47/62* (2013.01); *H04L 12/462* (2013.01); *H04L 12/4625* (2013.01)

(58) Field of Classification Search
CPC ..... H04L 47/10; H04L 47/62; H04L 47/622; H04L 47/625; H04L 47/628; H04L 47/70; H04L 41/0803; H04L 12/462; H04L 49/90; H04L 49/9005; H04L 49/9047; H04L 49/9052

See application file for complete search history.

(56) References Cited

U.S. PATENT DOCUMENTS

| | | | |
|---|---|---|---|
| 6,279,057 B1 * | 8/2001 | Westby | 710/52 |
| 6,374,314 B1 * | 4/2002 | Darnell et al. | 710/52 |
| 6,633,835 B1 | 10/2003 | Moran et al. | |
| 7,447,224 B2 * | 11/2008 | Dropps et al. | 370/412 |
| 7,843,906 B1 * | 11/2010 | Chidambaram et al. | 370/386 |
| 7,904,599 B1 * | 3/2011 | Bennett | H04L 67/1097 709/232 |
| 7,912,064 B2 * | 3/2011 | Elzur | H04L 12/2856 370/394 |
| 7,990,994 B1 * | 8/2011 | Yeh et al. | 370/431 |
| 2002/0176417 A1 * | 11/2002 | Wu | H04L 49/103 370/389 |

(Continued)

OTHER PUBLICATIONS

International Business Machines Corporation, "List of IBM Patents or Patent Applications Treated as Related," dated May 6, 2016, 2 pages.

*Primary Examiner* — Kevin Mew
(74) *Attorney, Agent, or Firm* — Patterson + Sheridan, LLP (57) ABSTRACT

A switch unit has one frame buffer pool for storing received frames and another frame buffer pool for storing large frames. The frame size in the large frame buffer pool may be optimized to the largest amount of data the switch unit that an FCoE switching is running on can support (i.e., a limitation of zone entries). Should free space be unavailable in the large frame buffer pool, or if a sequence grows bigger than can be supported, the switch unit may still continue to send response frames back to the sender. While the switch unit may store header information of the frame, the switch unit does not store the data of subsequent frames any longer. Once the sequence has been received completely, a rejection message is sent back with an appropriate error or reason code. The rejection message enables the sender to attempt a retransmission or cancel the current request altogether.

11 Claims, 5 Drawing Sheets

(56) References Cited

U.S. PATENT DOCUMENTS

| | | | |
|---|---|---|---|
| 2002/0176434 A1* | 11/2002 | Yu et al. | 370/422 |
| 2003/0043843 A1* | 3/2003 | Smith | H04L 12/185 370/462 |
| 2003/0118047 A1* | 6/2003 | Collette | H04L 12/4633 370/464 |
| 2003/0189935 A1 | 10/2003 | Warden et al. | |
| 2004/0062267 A1* | 4/2004 | Minami | H04L 12/5693 370/463 |
| 2005/0047334 A1* | 3/2005 | Paul | H04L 12/5601 370/229 |
| 2005/0165968 A1 | 7/2005 | Natarajan et al. | |
| 2005/0169188 A1 | 8/2005 | Cometto et al. | |
| 2005/0169258 A1* | 8/2005 | Millet | H04L 49/355 370/389 |
| 2006/0221944 A1* | 10/2006 | Ling et al. | 370/379 |
| 2006/0262784 A1* | 11/2006 | Cheethirala | H04L 67/1097 370/389 |
| 2008/0101236 A1* | 5/2008 | Miyamoto | 370/235 |
| 2008/0307122 A1* | 12/2008 | Butler et al. | 710/23 |
| 2010/0146103 A1* | 6/2010 | Hisatomi | H04L 12/2602 709/224 |
| 2011/0090804 A1* | 4/2011 | Wusirika | H04L 41/0806 370/252 |
| 2012/0063329 A1* | 3/2012 | Gnanasekaran | H04L 41/0213 370/248 |
| 2012/0155256 A1 | 6/2012 | Pope et al. | |
| 2013/0205164 A1* | 8/2013 | Tanaka | H04L 41/5016 714/5.1 |
| 2013/0223281 A1 | 8/2013 | Pandit | |
| 2014/0029609 A1* | 1/2014 | Ayandeh | H04L 49/357 370/389 |
| 2014/0198803 A1 | 7/2014 | Dalal et al. | |
| 2015/0312162 A1 | 10/2015 | Raisch et al. | |

* cited by examiner

HANDLING LARGE FRAMES IN A VIRTUALIZED FIBRE CHANNEL OVER ETHERNET (FCOE) DATA FORWARDER

BACKGROUND

Embodiments of the present disclosure generally relate to the field of computer networks.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

Fibre Channel (FC) can be used to connect these servers and computing resources, including connecting computer systems to storage devices such as storage area network (SAN) devices. Fibre Channel is a high speed medium primarily used for data transfer and storage, but may also be used to connect other devices, servers, printers, etc. Fibre Channel is essentially a serial data channel, often created over fiber optic cabling, that provides a logical bi-directional, point-to-point connection between a host and a device.

BRIEF SUMMARY

Embodiments of the present disclosure provide a method, computer program product, and system for managing a distributed Fibre Channel (FC) fabric. The method receiving a frame at a Fibre Channel (FC) interface of a switch unit and determining, by operation of a processor of the switch unit, whether the received frame is part of a multi-frame sequence. The method further includes, responsive to determining the received frame is not part of a multi-frame sequence, storing the received frame in a first frame buffer pool, and responsive to determining the received frame is part of a multi-frame, storing the received frame in a second frame buffer pool. The first frame buffer pool includes a first plurality of memory blocks sized with a maximum size of an individual FC frame. The second frame buffer pool includes a second plurality of memory blocks sized based on hardware zoning capabilities of the switch unit.

BRIEF DESCRIPTION OF THE SEVERAL VIEWS OF THE DRAWINGS

So that the manner in which the above recited aspects are attained and can be understood in detail, a more particular description of embodiments of the present disclosure, briefly summarized above, may be had by reference to the appended drawings.

It is to be noted, however, that the appended drawings illustrate only typical embodiments of this present disclosure and are therefore not to be considered limiting of its scope, for the present disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Devices may be connected on Fibre Channel systems using various interconnection topologies and devices, such as switches, hubs, and bridges, to allow scalability based on users' needs. As Fibre Channel networks get larger and network demands increase, switching may be implemented. A switched Fibre Channel network is referred to herein a "fabric." A fabric is simply the underlying switching architecture used by a Fibre Channel switch. A fabric may contain many loops interconnected with switches. Standards committees, such as the FC-BB-6 and FC-SW-6 working groups of the Technical Committee for Fibre Channel (T11) of the International Committee for Information Technology Standards (INCITS), have been working to develop a distributed switch model, with associated protocols, where a distributed Fibre Channel Forwarder (FCF) employs separate physical switching elements to perform control-plane and data-plane functionality. The distributed switch model and associated protocols of the current state of the art may be applied to both standard FC switches and switches configured to transport FC frames over different networking technologies, such as Fibre Channel over Ethernet (FCoE).

With the introduction of distributed switch technology by T11 in the FC-SW-6 communications protocol, new types of commands (e.g., N_Port_ID and Zoning ACL Distribution, Active Zoning ACL Distribution requests) have been created that could grow to a larger size than those of frames typically handled. As frames of such requests have to be received completely before a device is able to process the frames, frames of the larger requests need to be stored within memory buffer of the switch units for a longer time period, and additionally may need additional resources to process.

Accordingly, embodiments of the present disclosure provide a mechanism for switch units in a virtualized and distributed FCF to handle large frames. Such switch units include a first frame buffer pool and a second, different, frame buffer pool for storing large frames. The frame size in the second frame buffer pool may be optimized to the largest amount of data the switch unit that an FCoE switching is running on can support (i.e., a limitation of zone entries). If there is no space in the large frame buffer pool left, or if the frame gets bigger than the supported size, the switch unit may still continue to report response frames (e.g., ACK_1's) back to the sender. While the switch unit may store header information of the frame, the switch unit does not store the data of subsequent frames any longer. Once the sequence has been received completely, a rejection message (e.g., SW_RJT) is sent back with an appropriate error or reason code. The rejection message enables the sender to attempt a retransmission or cancel the current request altogether.

In the following, reference is made to embodiments of the disclosure. However, it should be understood that the disclosure is not limited to specific described embodiments. Instead, any combination of the following features and elements, whether related to different embodiments or not, is contemplated to implement and practice aspects of the present disclosure. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
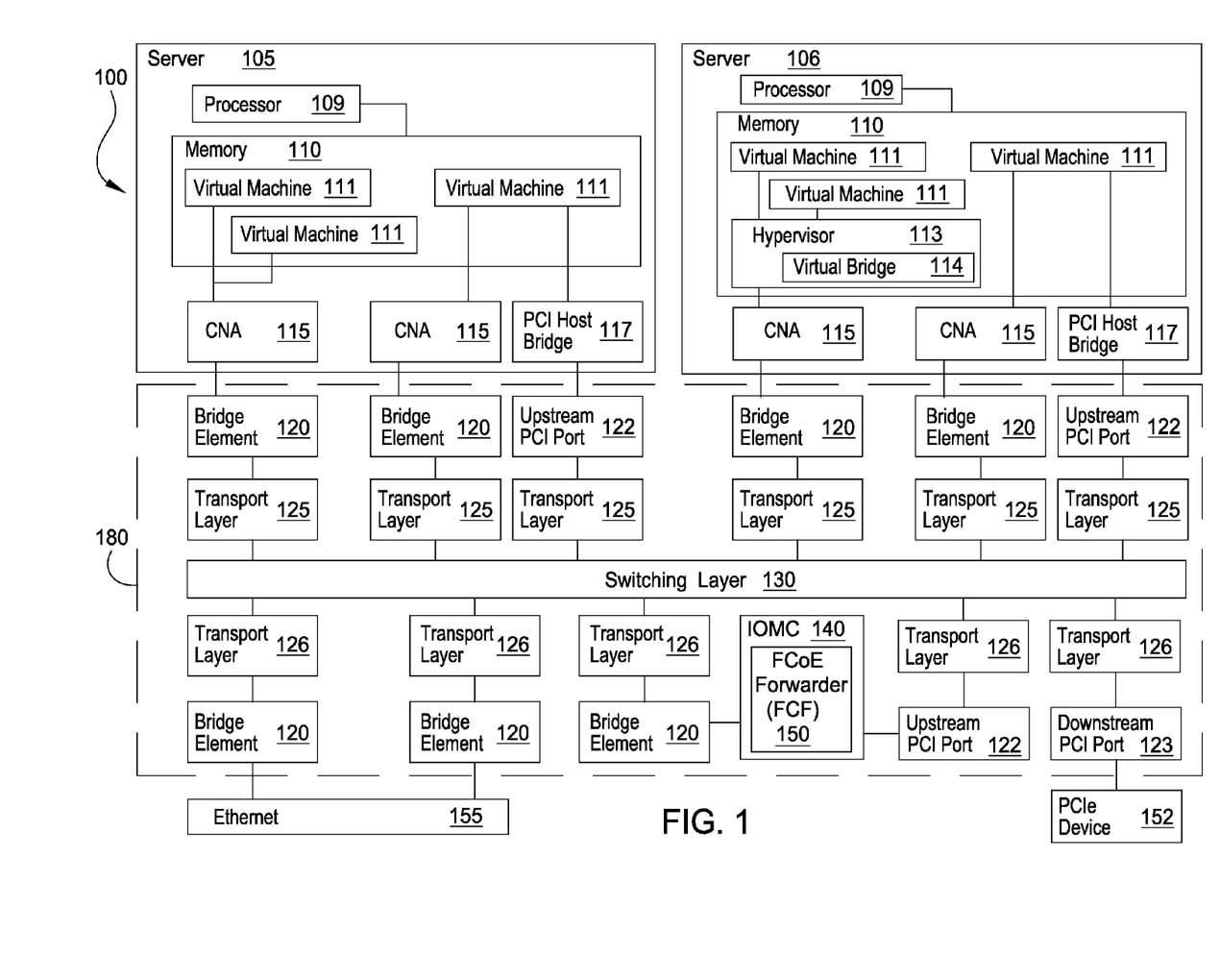
FIG. 1 illustrates a system architecture that includes a distributed network switch, according to one embodiment of the present disclosure.

FIG. 1 illustrates a system architecture 100 that includes a distributed network switch 180, according to one embodiment of the present disclosure. The computer system 100 includes first and second servers 105, 106 connected to the distributed network switch 180. In one embodiment, the first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105. The server 105 may operate under the control of an operating system (not shown) and execute various computer software applications, components, programs, objects, modules, and data structures, such as virtual machines 111.

The server 105 may include network adapters 115, sometimes referred to as converged network adapters (CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fibre Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the distributed network switch, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

As shown in FIG. 1, the second server 106 may include a processor 109 coupled to a memory 110 which includes one or more virtual machines 111 similar to those found in the first server 105. The memory 110 of server 106 may include a hypervisor 113 configured to manage data shared between different virtual machines 111. The hypervisor 113 may include a virtual bridge 114 that allows direct communication between connected virtual machines 111 rather than requiring the virtual machines 111 to use the bridge elements 120 or switching layer 130 to transmit data to other virtual machines 111 communicatively coupled to the hypervisor 113.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that are coupled to one of the bridge elements 120, also referred to herein as bridging elements. Additionally, to facilitate PCIe communication, the server may have a PCI Host Bridge 117. The PCI Host Bridge 117 may connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCIe device 152.

The distributed network switch 180 includes a plurality of bridge elements 120 that may be located on a plurality of a separate, though interconnected, hardware components. In one embodiment, the bridge elements 120 may be configured to forward data frames throughout the distributed network switch 180. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180. From the perspective of the network adapters 115, the distributed network switch 180 acts like one single switch even though the distributed network switch 180 may be composed of multiple switches that are physically located on different components, such as on different chassis or racks. Distributing the operations of the network switch 180 into multiple bridge elements 120 provides redundancy in case of failure.

Each of the bridge elements 120 may be connected to one or more transport layer modules 125, 126 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

In one embodiment, the switching layer 130 may comprise a local rack interconnect (LRI) which connects bridge elements 120 located within the same chassis and rack, as well as links that connect to bridge elements 120 in other chassis and racks. After routing the cells, the switching layer 130 may communicate with transport layer modules 125 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 152. The PCIe device 152 may be a passive backplane interconnect, as an expansion card interface for add-in boards, or common storage that can be accessed by any of the servers connected to the distributed network switch 180.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130. Although one IOMC 140 is shown, the system 100 may include a plurality of IOMCs 140. In one embodiment, IOMCs 140 may be arranged in a hierarchy such that one IOMC 140 is chosen as a master while the others are delegated as members. In another embodiment, the IOMCs 140 may be arranged in a peer-to-peer layout where the IOMCs 140 collaborate to administer and manage the elements of the distributed network switch 180.

The distributed network switch 180 may be configured to act as an FCoE Forwarder (FCF) 150, which is a Fibre Channel switching element that is able to forward FCoE frames across one or more switch ports to connected endpoints (i.e., servers 105, 106, storage devices). One example of an FCoE Forwarder is further described in the Fibre Channel Backbone 5 (FC-BB-5) standard published by T11 working group of the International Committee for Information Technology Standards (INCITS).

In the embodiment shown, IOMC 140 may include an FCoE Forwarder (FCF) 150. As discussed earlier, FCoE offers the capability to transport fiber channel payloads on top of an Ethernet network. The FCF 150 may execute a Fiber Channel Initialization Protocol (FIP) to discover and initialize FCoE-capable entities connected within the distributed network switch 180. The FCF 150 may further include firmware that encapsulates and de-encapsulates Fiber Channel data frames (e.g., FCoE formatted data frames). In at least one embodiment, the Fiber Channel Forwarder 150 may translate between Ethernet and Fiber Channel protocols. In the embodiment shown, the IOMC 140 is depicted in FIG. 1 having an instance of a FCF 150 that manages execution of FCF functionality across the bridge elements 120 of the distributed network switch 180. In one embodiment, the FCF 150 may be a distributed FCF where a controlling FCF element provides FC services to a large number of endpoints through many intermediate switches. An example of a distributed FCF is shown in FIG. 2.

Figure 2:
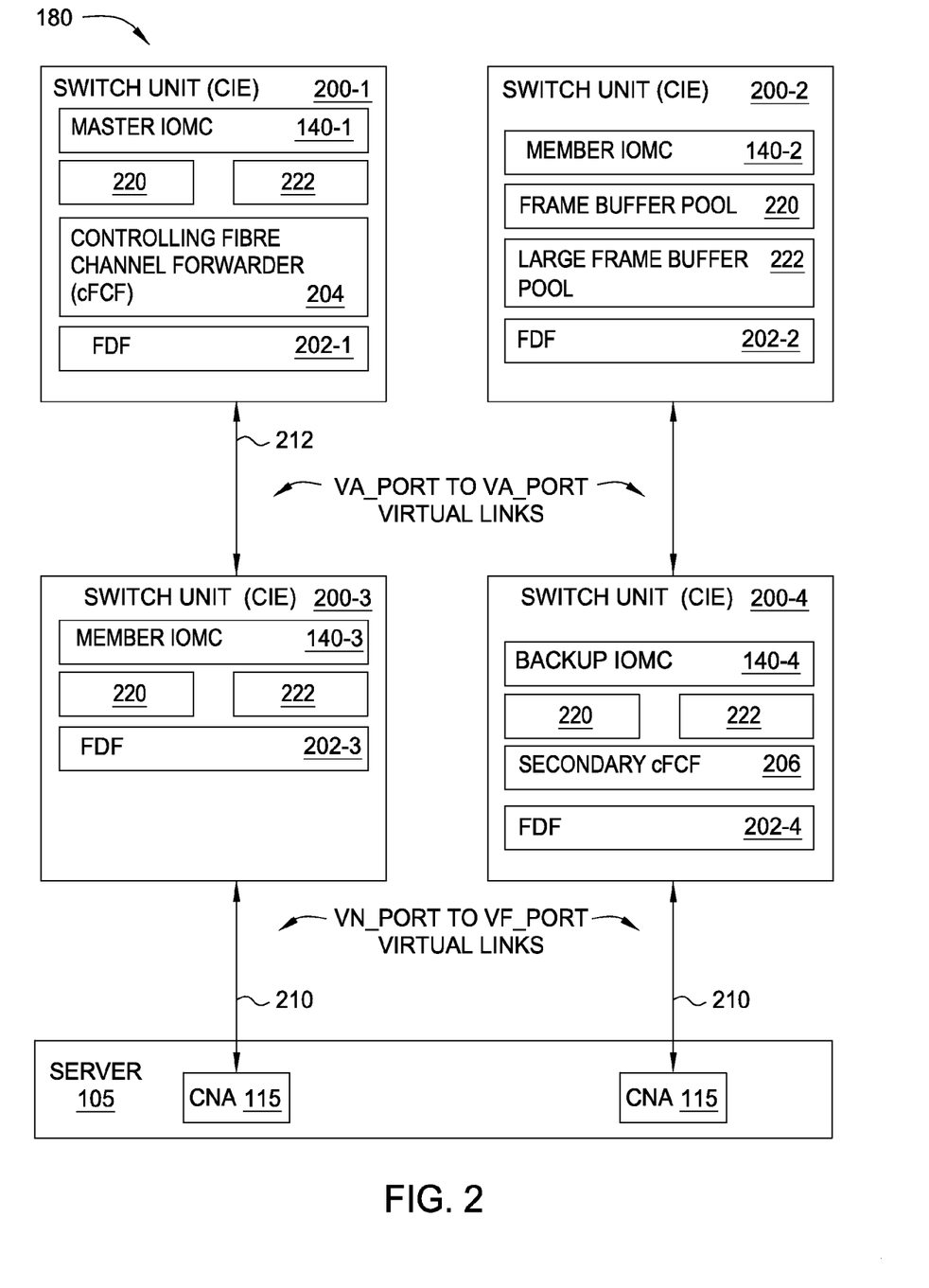
FIG. 2 illustrates the distributed network switch configured for Fibre Channel switching, according to one embodiment of the present disclosure.

FIG. 2 illustrates the distributed network switch 180 having a plurality of switch units 200 connected to the server 105, according to one embodiment of the present disclosure. The bridge elements 120 shown in FIG. 1 may be organized into one or more switch units 200 (e.g., 200-1, 200-2, 200-3, 200-4). The distributed network switch 180 disclosed herein is configured to provide distributed FCoE switching via multiple switch units 200, the switching layer 130 interconnecting the switch units 200, and management firmware executing on a management controller, e.g., IOMC 140.

A switch unit 200 (sometimes referred to as a chassis interconnect elements or CIE) may be a physical switch unit configured to provide network bridging for the distributed network switch 180. In one embodiment, the switch units 200 are hardware components (e.g., PCB boards, FPGA boards, system on a chip, etc.) that provide physical support and connectivity between the network adapters 115 and the bridge elements 120, shown in FIG. 1. Each switch unit 200 may include a logical or physical grouping of bridge elements 120. Each bridge element 120 may be a distributed Virtual Ethernet bridge (dVEB) configured to forward data frames throughout the distributed network switch 180, including data frames comprising FCoE frames. In one embodiment, each bridge element 120 may have at least two ports, one port connecting to the switching layer 130 and another port connected to the servers 105 and 106 (e.g., via network adapters 115). The bridge elements 120 may forward data frames transmitted by the network adapter 115 to the switching layer 130. In one implementation, a network adapter 115 and bridge element 120 may be connected using two 40 Gbit Ethernet connections or one 100 Gbit Ethernet connection.

Referring back to FIG. 2, according to one embodiment, the distributed network switch 180 may be a distributed FCF having a set of FCoE Data Forwarders 202 (FDFs) associated with at least one controlling FCF 204, 206 that controls the operations of the set of FDFs. The cFCFs 204, 206 defines a control plane for managing the distributed FCF and the FDFs 202 define a data plane for forwarding FCoE frames. The cFCFs and FDFs operate together to behave as a single distributed FCF such that a FCoE frame ingressing on a port in one switch unit 200 may be routed to egress from a port in any other switch unit 200. From an external point of view (i.e., from the perspective of the server 105), the distributed FCF behaves as an FCF. In particular, the distributed FCF supports instantiation of VN_Port to VF_Port virtual links 210 with ENode MAC addresses (i.e., CNAs 115), and instantiation of VE_Port to VE_Port virtual links (not shown) with FCF-MACs. A "VN_Port" is a Virtual N_Port and refers to a port in an Enhanced Ethernet node (ENode), and a "VF_Port" is a Virtual F_port and refers to a port in an FCoE-capable Ethernet switch. A "VE_Port" is a Virtual E_port and refers to an inter-switch link port. From an internal point of view (i.e., from the perspective of the FCF), the distributed FCF may instantiate VA_Port to VA_Port virtual links 212 to enable FCoE frame forwarding between the cFCFs 204, 206 and FDFs 202, as well as between FDFs 202. A "VA_Port" is an instance of the FC-2V sublevel of Fibre Channel that connects to another VA_Port, and which is dynamically instantiated together with an FCoE_LEP on successful completion of a FIP ELP Exchange. VA_Port to VA_Port virtual links 212 may also be used to exchange control information between cFCFs 204, 206 and FDFs 202, as described in greater detail later.

In one embodiment, each switch unit 200 may instantiate a FDF 202 (FDF), which are simplified FCoE switching entities that forward FC frames among ports through the distributed network switch 180. In one embodiment, a FDF 202 is a simplified FCoE switching element configured to forward FC frames among VA_ports and VF_ports through a Fibre Channel data-plane forwarder (FCDF) switching element. In some embodiments, an FDF 202 is functionally composed of a FCDF switching element with at least one Lossless Ethernet MAC (FDF-MAC), which may be physical or virtual ports of a switch unit 200. The FDF 202 may support instantiation of VA_Ports and VF_Ports over its FDF-MACs.

In one embodiment, at least one of the switch units 200 includes a controlling FCoE forwarder 204, 206 (sometimes referred to as a controlling FCF, cFCF, or primary controlling switch). The cFCFs are configured to control and manage FDFs 202 to provide fabric services, through the FDFs 202 on each switch unit 200, to all endpoints (e.g., server 105) connected to the switch ports. In the embodiment shown in FIG. 2, the switch units 200 include a primary cFCF 204 that controls the FDFs 202, and a secondary cFCF 206 that synchronizes state with the primary cFCF 204 and is able to resume operation in case of failure of the primary cFCF 204. Examples of FDFs and cFCFs are described in the Fibre Channel Backbone-6 (FC-BB-6) and the Fibre Channel Switch Fabric 6 (FC-SW-6) standards published by T11 working group of the International Committee for Information Technology Standards (INCITS).

In one or more embodiments, the distributed network switch 180 may be configured to support virtualization mechanisms, such as virtual local area networks (VLANs), which are multiple distinct broadcast domains partitioned from the (Layer-2) network of the distributed network switch 180. In one embodiment, the distributed FCF provided by the distributed network switch 180 is virtualized for usage in different VLAN instances, that is, each VLAN may have its own corresponding instance of a virtual distributed FCF. As embodiments of the distributed network switch 180 that are comprised of embedded systems may have a limited amount of computer resources (particularly memory resources), such embodiments may share the limited memory resources over multiple VLANs. Approaches that use a dynamic allocation of memory resources may suffer from fragmentation issues and deal with non-deterministic behavior of a garbage collector. As such, an approach may be desired where memory is allocated statically into one or more buffer pools, also referred to as memory pools.

Since the full amount of VLANs supported by a device are not typically active at a same time, and it may be unpredictable how many VLANs a user will ultimately activate, the memory resources are over-provisioned to prevent wasted resources and a strong limitation to the device to otherwise separate the memory resources. In many cases, a frame is not stored within memory for an extended period of time, such that memory resources can be freed up quickly. Additionally, the Fibre Channel protocol uses a flow control mechanism to reduce likelihood of congestion, frame dropping, and buffer overflows. Flow control may be implemented using a credit system. End devices (e.g., cFCFs, FDFs) are issued with a number of credits and are permitted to transmit one frame for each credit the end device has. One example of a flow control mechanism is an end-to-end (E2E) credit system shown in FIG. 3.

Figure 3:
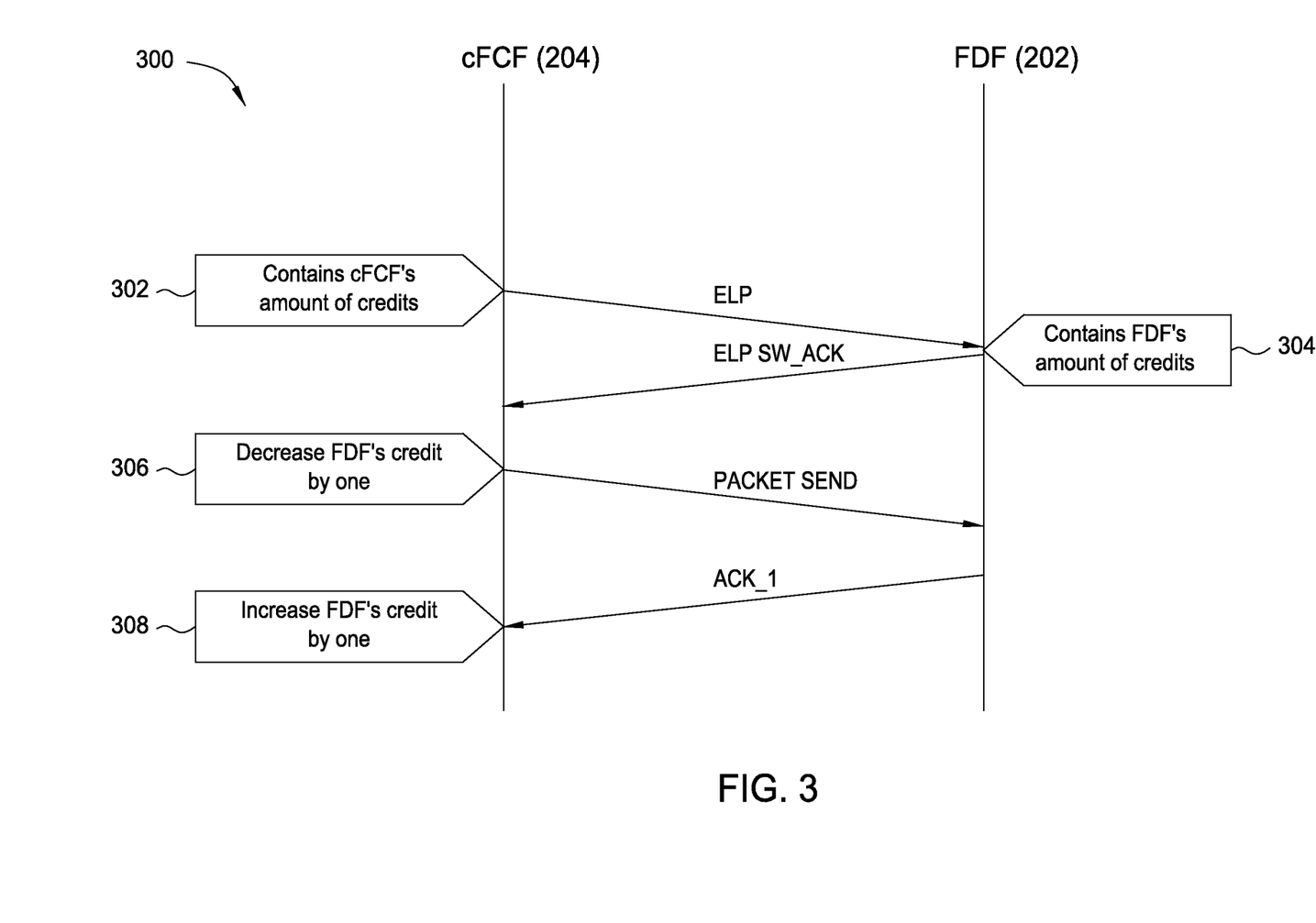
FIG. 3 is a sequence diagram depicting operations of an end to end credit mechanism between switching elements of a distributed Fibre Channel fabric, according to one embodiment of the present disclosure.

FIG. 3 is a sequence diagram depicting operations 300 of an end to end credit mechanism between a cFCF 204 and a FDF 202 of a distributed FCF, according to one embodiment of the present disclosure. While FIG. 3 depicts the credit mechanism as applied to communications sent by the cFCF, it should be noted communications sent by the FDF may be subject to the same credit system, that is, the E2E credit system works in both directions.

The operations 300 begin at step 302, where the cFCF 204 establishes a virtual link by transmitting an FCoE Initialization Protocol (FIP) Exchange Link Parameters (ELP) request to the FDF 202. The ELP request may contain an indication of the amount of the credits that the cFCF 204 has. At step 304, the FDF 202 accepts the ELP request, instantiating a virtual link between at least one port associated with the FDF 202 and at least one port associated with the cFCF 204, and transmits an ELP acceptance message (ELP SW_ACK) back to the cFCF 204. The ELP acceptance message contains an indication of the amount of the credits that the FDF 202 has. Each time a sender (e.g., cFCF 204) sends a frame to a destination device, as in step 306, the sender decreases its credit by one. Each time the sender (e.g., cFCF 204) receives an acceptance frame (depicted as ACK_1) from the destination device, as in step 308, which confirms receipt of the frame to the sender, the sender increases its credit by one. At any given time, if no credits remain, no frame may be sent. In some embodiments, for performance reasons, the acceptance frame (i.e., ACK_1) is sent after a frame is received by the destination device, rather than after release of the frame from a memory buffer of the destination device. As such, an overflow of the memory buffers could happen, with probability of such an occurrence increasing with the time that the frame stays in the buffer.

With the introduction of distributed switch technology, as provided by the FC-SW-6 standard published by T11 working group of INCITS, the FDFs and cFCFs may send large packets, such as N_Port_ID and Zoning ACL Distribution (NPZD) and Active Zoning ACL Distribution (AZAD) request sequences. It is noted that all frames of a sequence have to be received completely before a device is able to process the frames. As such, in some cases, the frames of such sequences would have to be stored for a longer time frame and would need additional time to process relative to other packets, resulting in a higher probability that the buffers may overflow. In some cases, an NPZD packet might contain more peering entries than can be programmed into the hardware of a switch unit 200, as there is currently no handshake protocol between a cFCF and an FDF that establishes how many zones an FDF can handle. It is recognized that there is currently no established mechanism to limit the size of an FCoE packet. It is further recognized that rejecting a single frame of a FCoE sequence may be cumbersome and time-expensive operation as there is no well-formed recovery mechanism within the FC protocol. As such, there is a desire to handle large frames in a virtualized FCoE environment.

Accordingly, embodiments of the present disclosure provide switch units in a distributed switch fabric that are configured to handle large frames and further provide mechanisms for higher-level recovery to deal with problems in handling such frames.

Referring back to FIG. 2, each switch unit 200 of the distributed network switch 180 may include memory resources organized as different buffer pools, depicted as a frame buffer pool 220 and a large frame buffer pool 222. The buffer pools are formed by statically pre-allocating different groups of memory blocks with uniform sizes. The switch unit may allocate, access, and free memory blocks from the buffer pools to temporarily store frames (e.g., FCoE frames) received by a switch unit while the frames are waiting to be processed.

In one embodiment, the frame buffer pool 220 includes a plurality of memory blocks pre-allocated to a size set to a maximum frame size as permitted according to the FCoE standard, e.g., 2148-byte memory blocks. The large frame buffer pool 222 includes a plurality of memory blocks having a larger size than the memory blocks of the frame buffer pool 220. In one embodiment, the memory blocks in the large frame buffer pool 222 may be pre-allocated with a size that is based on the hardware capabilities of the switch unit 200, such as hardware zoning capabilities or other routing capabilities. The memory blocks of a large frame buffer pool 222 of a switch unit 200 having hardware capabilities to support N zones are statically allocated with a size sufficient to store the larger frames of a FCoE request, for example, specifying ACL information for N zones or less, in the case of NPRD requests, or communicating when a new zone set for N zones or less is activated, in the case of AZAD requests. In some embodiments, the size of memory blocks in the large frame buffer pool 222 are set to a largest amount of data the switch unit on which the FDF or cFCF is running can support, i.e., a limitation of zone entries.

According to one embodiment, when cFCF 204 establishes a virtual link by transmitting the ELP request to the FDF 202 (e.g., as in FIG. 3), the link parameters advertised for a FDF may contain less credits than there is available space in the frame buffer pool 220. However, the total amount of ELP credits across all VLANs supportable by the switch unit is still greater than the available space in the frame buffer pool 220. In other words, the frame buffer pool 220 is over-provisioned over multiple VLANs.

In operation, large frames, such as NPZD and AZAD requests, which would otherwise need more than one frame from the frame buffer pool 220 (e.g., larger than 2148 bytes), are instead stored in the large frame buffer pool 222. If there is no buffer space left in the large frame buffer pool 222 or if the received frame becomes bigger than the maximum hardware capabilities of the switch unit can handle, the switch unit 200 is configured to drop the frame, yet continue sending acknowledgement messages (e.g., ACK_1), and recover on a higher-level protocol at a subsequent time (e.g., FC SW-6).

FIGS. 4A-4D are flow diagrams depicting a method 400 for handling large frames in a virtualized FCoE environment, according to one embodiment of the present disclosure. FIGS. 4A-4D is described generically as operations of a switch unit 200, although it should be noted that the operations may be performed by instances of a virtualized FCoE switching element (e.g., cFCF or FDF) executing within the switch unit.

Figure 4A:
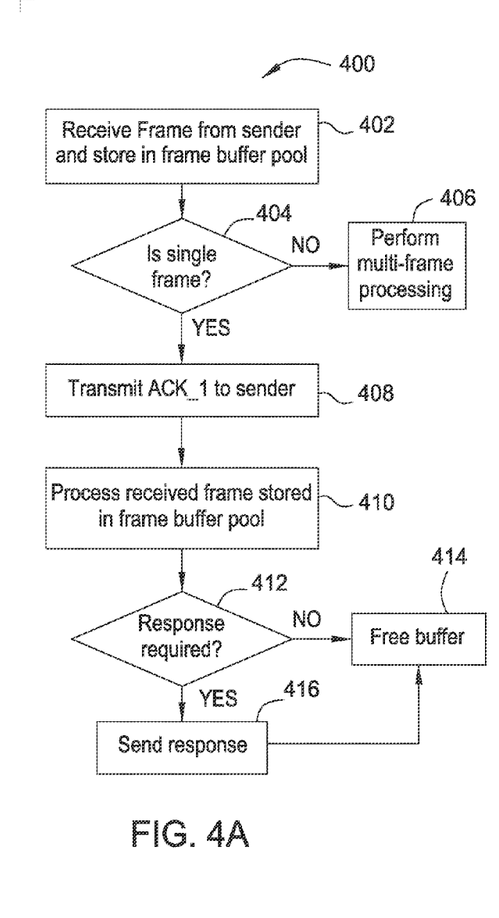
FIGS. 4A-4D are flow diagrams depicting a method for handling large frames in a virtualized FCoE environment, according to one embodiment of the present disclosure.

As shown, the method 400 begins at step 402, where the switch unit receives an ingress frame. In one "fasten up" implementation, the frame may be received from a hardware pipe of incoming data and subsequently stored in a memory block allocated from the frame buffer pool 220. In such an implementation, should the switch unit determine that received frame is to be stored in the large frame buffer pool 222 instead, the switch unit may copy the received frame to the large frame buffer pool 222. Otherwise, should the switch unit determine that the received frame is to be stored in the large frame buffer pool 222, the switch unit need not take further action, as the received frame remains in the frame buffer pool 220. Alternatively, the received frame may be stored in an intermediary staging area within memory until the switch unit determines if the received frame is to be stored in the frame buffer pool 220 or the large frame buffer pool 222 and copies the received frame to the selected buffer pool.

At step 404, the switch unit determines whether the received frame is a single frame. In one embodiment, the switch unit may determine the received frame is a single frame based on header information contained in the frame indicating that the frame is both the first frame and the last frame of a sequence. For example, in one implementation, the switch unit may check bits of a frame control field in the frame header of the received frame indicating whether the received frame is a last frame of a sequence (e.g., End_Sequence bit of the F_CTL field). If the switch unit determines the received frame is not a single frame, the switch unit may proceed to step 406 and perform multi-frame processing, described later in conjunction with FIG. 4B. As used herein, a "multi-frame" refers to one frame that is part of a plurality of frames that form a Fibre Channel request. In some cases, the multi-frame may be part of a large control plane request, such as an NPZD Request sequence, or an AZAD Request sequence.

At step 408, responsive to determining the received frame is a single frame, the switch unit transmits a response frame (e.g., ACK_1) to the sender indicating successful delivery of the frame. The response frame acknowledges receipt of the frame and provides end-to-end flow control between the sender and the switch unit. As such, it is noted that the response frame may cause the sender to increment the E2E credit count on the sender side and continue sending frames. At step 410, the switch unit processes the received frame stored in the frame buffer pool 220, as the received frame is considered complete and ready to be processed.

At step 412, the switch unit determines whether a response is required for the received frame. If not, at step 414, the switch unit frees the memory block of the frame buffer pool 220 storing the received frame. Otherwise, at step 416, the switch unit transmits an appropriate response to the received frame, for example, a FC control plane reply sequence, and proceeds to step 414 to free the memory block.

Figure 4B:
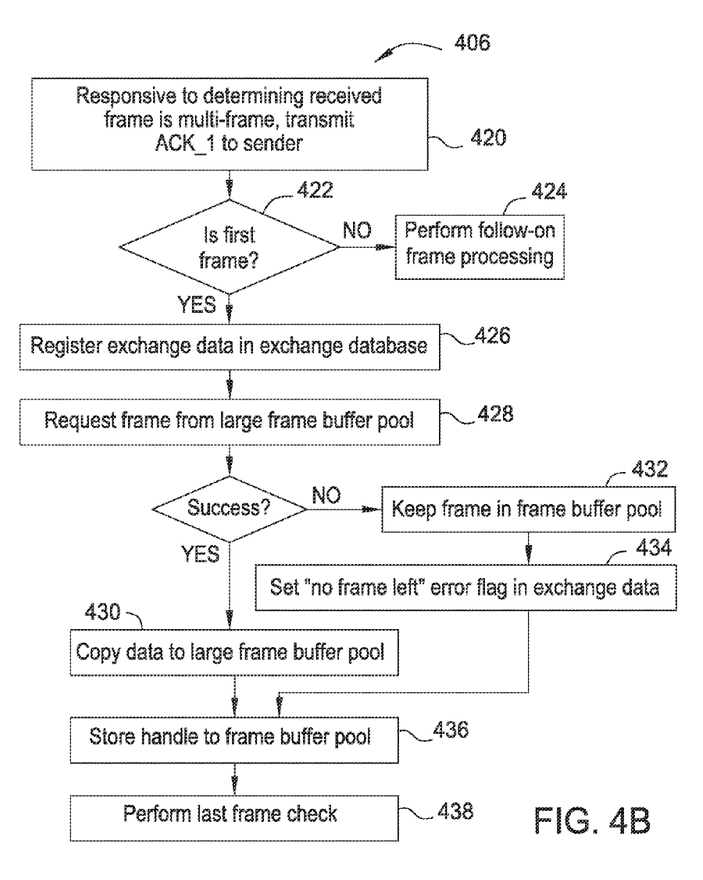

FIG. 4B is a flow diagram depicting method steps for processing multi-frame communications in a virtualized FCoE environment, according to one embodiment of the present disclosure. It is recognized that the method steps of FIG. 4B represent operations that may be performed during step 406 of FIG. 4A.

At step 420, responsive to determining that a received frame is a multi-frame, the switch unit transmits a response frame (e.g., ACK_1) to the sender acknowledging receipt of the frame. It is noted that the response frame may cause the sender to increment the end-to-end credit on the sender side and continue sending other multi-frames or other frames.

At step 422, the switch unit determines whether received frame is a first frame of the multi-frames in the sequence. If not, the switch unit may determine the received frame is a "follow-on frame" and proceed to follow-on frame processing in step 424, described in greater detail later in conjunction with FIG. 4C. As used herein, a follow-on frame refers to a multi-frame that is not the first frame of the multi-frames in a sequence, for example, the second or third frame (i.e., a middle frame), or the last frame in the sequence.

At step 426, responsive to determining the received frame is a first multi-frame, the switch unit registers exchange data contained in the first multi-frame in an exchange database maintained by the switch unit. The exchange data identifies a Fibre Channel exchange between two points, and may include information found in the frame header, such as a source identifier (i.e., S_ID), a destination identifier (i.e., D_ID), an exchange identifier assigned by the Originator of the exchange (i.e., Originator Exchange_ID, or OX_ID), and an exchange identifier assigned by the Responder of the exchange (i.e., Responder Exchange_ID, or RX_ID), although other exchange data may be used.

At step 428, the switch unit requests a memory block from the large frame buffer pool 222. It is noted that in many cases this request may be successful, that is, a free memory block from the large frame buffer pool 222 is allocated to store the received frame, and the large frame buffer pool 222 internally marks the allocated memory block as unavailable. However, in some cases, this request may be unsuccessful because there may be no free memory blocks left, that is, all memory blocks in the large frame buffer pool 222 are currently marked as unavailable.

At step 430, responsive to determining a memory block has been successfully allocated, the switch unit copies the data of received frame to the allocated memory block of the large frame buffer pool 222. In some embodiments, the switch unit copies the data of the received frame from a memory block of the frame buffer pool 220 that served as a temporary storage to the allocated memory block of the large frame buffer pool 222, and frees the temporary memory block of the frame buffer pool 220. Alternatively, the switch unit copies data of the received frame from the intermediary staging area within memory to the allocated memory block of the large frame buffer pool 222. It is noted that the data of the received multi-frame may not occupy the entire memory block of the large frame buffer pool 222, leaving some amount of available space in the memory block for subsequently received frames of the same sequence.

Otherwise, in one embodiment, at step 432, responsive to determining that a memory block was not successfully allocated from the large frame buffer pool 222, the switch unit keeps the received frame within the memory block from the frame buffer pool 220 that was serving as temporary storage. Alternatively, the switch unit may copy the data of the received frame from the intermediary staging area within memory to an allocated memory block of the frame buffer pool 220. At step 434, the switch unit sets one or more error flags in the registered exchange data within the exchange database associated with the first multi-frame. In one example, the error flags may indicate an error was raised due to no memory blocks being left in the large frame buffer pool 222 (i.e., "No Buffer Left").

At step 436, the switch unit stores a handle (e.g., pointer) to the memory block storing the first multi-frame, i.e., in the large frame buffer pool 222 (in the case of step 430), or in the regular frame buffer pool 220 (in the case of step 432). The handle may be stored in the newly-registered exchange data within the exchange database corresponding to the first multi-frame. In some embodiments, the switch unit stores an indication of a starting location of available space within the memory block, i.e., the location after where the data of the first multi-frame is stored. For example, the switch unit may store the handle to the memory block storing the first multi-frame, and an offset value indicating the location of available space.

Figure 4C:
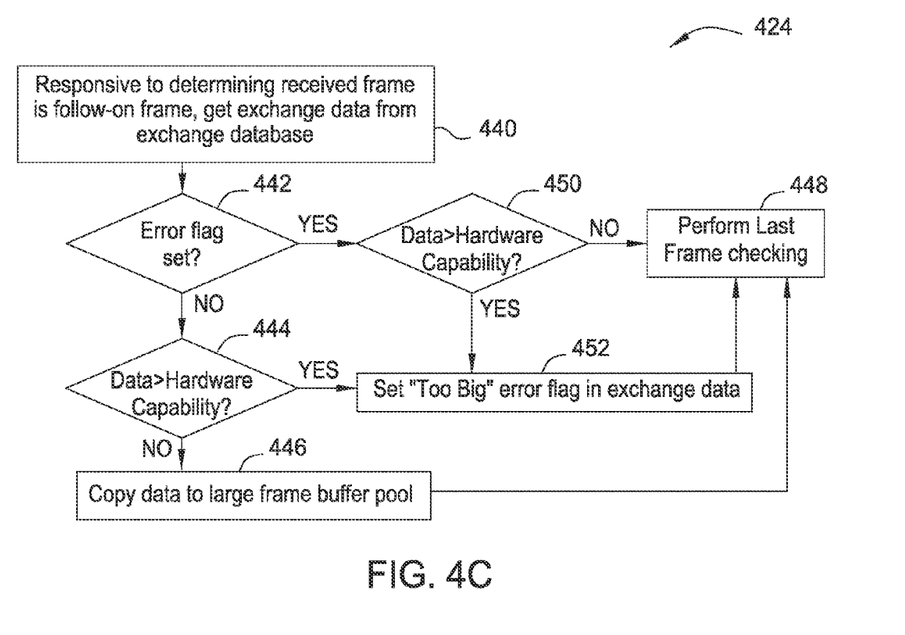
Figure 4D:
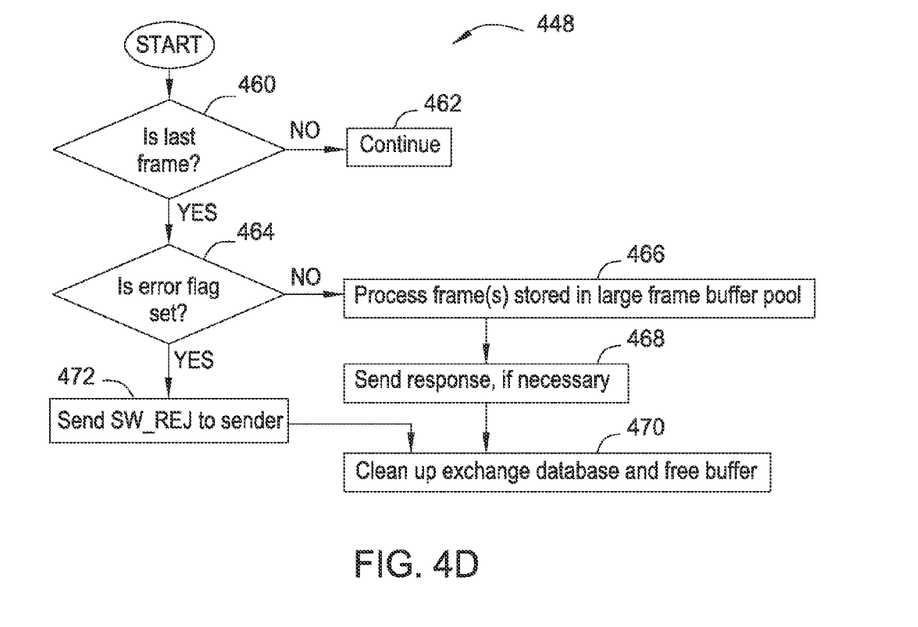

At step 438, the switch unit checks whether the received frame is a last frame of the multi-frames in the sequence, as described in greater detail in FIG. 4D.

FIG. 4C is a flow diagram depicting method steps for processing follow-on frames in a virtualized FCoE environment, according to one embodiment of the present disclosure. It is recognized that the method steps of FIG. 4C represent operations that may be performed during step 424 of FIG. 4B.

At step 440, responsive to determining the received frame is a follow-on frame, the switch unit gets exchange data from the exchange database associated with the received frame. In the case of a follow-on frame, it is noted that exchange data is already registered within the exchange database upon arrival of the first frame, for example, during operations of step 426 described earlier. In one embodiment, the switch unit retrieves exchange data about the Fibre Channel exchange of which the received frame is a part, using information found in the frame header, such as the source identifier (i.e., S_ID), a destination identifier (i.e., D_ID), an exchange identifiers (e.g., Originator Exchange_ID, Responder Exchange_ID), although other fields may be used. The retrieved exchange data may include information about the state of the Fibre Channel exchange, as embodied in one or more state fields and/or error flag fields. The retrieved exchange data may include a handle identifying which memory block(s) from the large frame buffer pool 222, or in some cases, the frame buffer pool 220, are storing prior-received frames of the exchange.

At step 442, the switch unit determines whether an error flag has been set for the exchange based on the retrieved exchange data. In one embodiment, the switch unit checks an error flag field within the retrieved exchange data for "1" bit values, "true" values, or other pre-assigned value indicating an error has occurred during receipt of frames for the associated exchanged. In one example, the switch unit may check whether an error flag indicating that no memory blocks were available in the large frame buffer pool 222 (i.e., "No Buffer Left") had been raised.

If not, at step 444, responsive to determining that error flags have not been set, the switch unit may further determine whether the amount of data of the received frame is greater than the hardware capability of the large frame buffer pool 222. In one embodiment, the switch unit determines whether the amount of data of the follow-on frame exceeds the amount of available space in the memory block storing data of the sequence.

In step 446, responsive to determining the data of the received follow-on frame does not exceed the hardware capabilities of the switch unit, the switch unit copies the data of the received follow-on frame to the memory block in the large frame buffer pool 222. As such, the received follow-on frame is stored in the large frame buffer pool 222, along with other prior received frames of the same sequence. In some embodiments, the switch unit copies data of the received follow-on frame from a memory block of the frame buffer pool 220 (that served as a temporary storage) to the memory block of the large frame buffer pool 222 identified by the exchange data. The switch unit may then free the temporary memory block of the frame buffer pool 220. Alternatively, the switch unit copies data of the received follow-on frame from the intermediary staging area within memory to the memory block of the large frame buffer pool 222. At step 448, the switch unit checks if received follow-on frame is a last frame in the sequence, as described in greater detail in conjunction with FIG. 4D.

At step 452, responsive to determining that the data of the received follow-on frame does indeed exceed the hardware capabilities of the switch unit, the switch unit sets an error flag in the registered exchange data within the exchange database associated with the follow-on frame. The error flag may indicate an error was raised due to the received multi-frame exceeds the hardware capabilities of the switch unit (i.e., "Frame Too Big"). The switch unit may proceed to step 448 and check if received follow-on frame is a last frame in the sequence, as described later. It is noted that even though an error was raised during handling of the frame, a response frame (e.g., ACK_1) was nonetheless transmitted to the sender of the frame in step 420, which allows the sender to complete transmission of the sequence.

In some embodiments, at step 450, responsive to determining that error flags have not been set (i.e., in step 442), the switch unit may further determine whether the amount of data of the received frame would have been greater than the hardware capability of the large frame buffer pool 222. It is noted that different error flags may result in different remedial actions (by the sender), such as retry attempts or error reporting. For example, a "No Buffer Left" error flag may result in a retry attempt by the sender to transmit the frames of the sequence at a different time (i.e., hoping at that later time the large frame buffer pool 222 has a memory block freed). In contrast, a "Frame Too Big" error may not result in a retry attempt by the sender, as the hardware capabilities of the switch unit are fixed and not subject to change during operation of the switch unit. As such, although an error flag may already have been set indicating no buffer left is left in the large frame buffer pool 222, the switch unit nonetheless checks for whether the follow-on frame would have exceeds the hardware capabilities of the large frame buffer pool 222. If so, at step 452, the switch unit sets an error flag in the registered exchange data associated with the follow-on frame, and proceeds to step 448. Otherwise, the switch unit may proceed to step 448.

FIG. 4D is a flow diagram depicting method steps for checking for last multi-frames in a sequence in a virtualized FCoE environment, according to one embodiment of the present disclosure. It is recognized that the method steps of FIG. 4D represent operations that may be performed during step 434 of FIG. 4B and step 448 of FIG. 4C.

At step 460, the switch unit determines whether the received frame is a last frame in a sequence. In one embodiment, the switch unit may determine the received frame is a last frame based on header information contained in the frame indicating that the frame is the last frame of a sequence. For example, the switch unit may check bits of a frame control field in the frame header of the received frame indicating whether the received frame is a last frame of a sequence (e.g., End_Sequence bit of the F_CTL field), although other header information may be used. At step 462, if the received frame is not determined to be a last frame, the switch unit may continue receiving and processing multi-frames of the sequence as normal.

Otherwise, at step 464, responsive to determining the received frame is a last frame, the switch unit checks whether an error has been raised during handling of the received frame. In some embodiments, the switch unit checks one or more error flag fields in the exchange data associated with the received frame. If no errors, the switch unit has determined that all frames of the sequence has been completely received and are ready to be processed. As such, at step 466, the switch unit processes the received frame as well other prior received frames of the sequence (stored in the memory block) in the large frame buffer pool 222. It is noted that processing the frame(s) of the sequence may result in changes to the state of an FCoE switching element (e.g., FDF) executing in the switch unit. In one example, the frames of the sequence may be handed off to an instance of a FDF associated with a particular VLAN. Optionally, at step 468, the switch unit may generate and transmit an appropriate response for the processed frames, for example, a FC control plane reply sequence, to the sender of the frames. In some cases, the switch unit may transmit an accept reply sequence (i.e., SW_ACC) notifying the sender that a request sequence has been completed.

At step 472, responsive to determining that an error had been raised, the switch unit notifies the sender of the errors by transmitting a rejection message, for example, a FC control plane rejection sequence (i.e., SW_RJT). As such, embodiments wait until a sequence has been received completely before sending a rejection message back to the sender with appropriate metadata. In one embodiment, the rejection message may include an indication of the errors raised embodied in one or more error codes and/or error explanation text. In some cases, the rejection message may notify the sender that an error occurred during receipt of one or more frames of a sequence due to no available buffer space left in the large frame buffer pool 222. In response to such an error, the sender may take remedial actions, such as re-transmitting the sequence immediately or at a later time. In another example, the rejection message may notify that the sender that an error occurred during receipt of frames because the frames exceeded the hardware capabilities of the switch unit. In response to such an error, the sender may characterize this error as a fatal error and cease further efforts to re-send the frames of the sequence. The sender may escalate the fatal error to higher level processes, such as management software or other applications managing the distributed network switch 180. As such, in some embodiments, the rejection message may include a rejection code or other indication that the sender may or may not attempt retransmission of frames of the sequence.

At step 470, the switch unit cleans up exchange data in the exchange database associated with the received frame. The switch unit frees the allocated memory block in the large frame buffer pool 222, which may be used to store any large frames subsequently received. The large frame buffer pool 222 may change the status of the allocated memory block from allocated to an available status.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the present disclosure may be devised without departing from the basic scope thereof, and the scope thereof is determined by the claims that follow.

What is claimed is:

1. A computer program product for managing a distributed Fibre Channel fabric, the computer program product comprising:
    a computer-readable storage medium having computer-readable program code embodied therewith, the computer-readable program code comprising:
    computer-readable program code configured to receive a frame at a Fibre Channel (FC) interface of a switch unit;
    computer-readable program code configured to determine whether the received frame is part of a multi-frame sequence;
    computer-readable program code configured to, responsive to determining the received frame is not part of a multi-frame sequence, store the received frame in a first frame buffer pool, wherein the first frame buffer pool comprises a first plurality of memory blocks sized with a maximum size of an individual FC frame; and
    computer-readable program code configured to, responsive to determining the received frame is part of a multi-frame, store the received frame in a second frame buffer pool, wherein the second frame buffer pool comprises a second plurality of memory blocks sized based on hardware zoning capabilities of the switch unit, and wherein the computer-readable program code configured to store the received frame in the second frame buffer pool comprises:
        computer-readable program code configured to, responsive to determining that the multi-frame sequence associated with the received frame would have exceeded the hardware zoning capabilities of the switch unit, set an error flag indicating that the multi-frame sequence exceeds the hardware zoning capabilities of the switch unit, and
        computer-readable program code configured to, responsive to receiving a last frame of the multi-frame sequence and if the error flag is set, transmit a rejection sequence notifying a sender of the frame of the error flag, wherein the rejection sequence indicates the sender should not attempt retransmission of the frame.

2. The computer program product of claim 1, wherein the computer-readable program code configured to store the received frame in the second frame buffer pool further comprises:

computer-readable program code configured to, responsive to determining that the received frame is a first frame of the multi-frame sequence, register header information of the received frame as exchange data;

computer-readable program code configured to allocate a memory block from the second frame buffer pool; and computer-readable program code configured to copy the received frame to the memory block of the second frame buffer pool.

3. The computer program product of claim 1, further comprising computer-readable program code configured to transmit, to the sender of the frame, a response frame that acknowledges receipt of the frame, wherein the response frame causes an increase of end-to-end credit at the sender of the frame.

4. The computer program product of claim 1, further comprising:

computer-readable program code configured to transmit to the sender of the frame a response frame acknowledging receipt of the frame, wherein the frame is discarded by the switch unit.

5. The computer program product of claim 1, wherein the multi-frame sequence of the received frame comprises at least one of a N_Port _ID and Zoning ACL Distribution (NPZD) request sequence and an Active Zoning ACL Distribution (AZAD) request sequence.

6. An apparatus, comprising:

a memory comprising a first frame buffer pool and a second frame buffer pool, wherein the first frame buffer pool comprises a first plurality of memory blocks sized with a maximum size of an individual Fibre Channel (FC) frame, and wherein the second frame buffer pool comprises a second plurality of memory blocks sized based on hardware zoning capabilities of the apparatus; and one or more computer processors configured to perform an operation comprising:

receiving a frame at a FC interface of the apparatus;

determining, by operation of the one or more computer processors, whether the received frame is part of a multi-frame sequence;

responsive to determining the received frame is not part of a multi-frame sequence, storing the received frame in the first frame buffer pool; and responsive to determining the received frame is part of a multi-frame, storing the received frame in a second frame buffer pool, wherein the one or more computer processors configured to store the received frame in the second frame buffer pool are further configured to perform the operation comprising:

responsive to determining that the multi-frame sequence associated with the received frame would have exceeded the hardware zoning capabilities of the apparatus, setting an error flag indicating that the multi-frame sequence exceeds the hardware zoning capabilities of apparatus; and responsive to receiving a last frame of the multi-frame sequence and if the error flag is set, transmitting a rejection sequence notifying a sender of the frame of the error flag, wherein the rejection sequence indicates the sender should not attempt retransmission of the frame.

7. The apparatus of claim 6, wherein the one or more computer processors configured to store the received frame in the second frame buffer pool are further configured to perform the operation comprising:

responsive to determining that the received frame is a first frame of the multi-frame sequence, registering header information of the received frame as exchange data;

allocating a memory block from the second frame buffer pool; and copying the received frame to the memory block of the second frame buffer pool.

8. The apparatus of claim 6, wherein the one or more computer processors are further configured to perform the operation comprising:

transmitting, to the sender of the frame, a response frame that acknowledges receipt of the frame, wherein the response frame causes an increase of end-to-end credit at the sender of the frame.

9. The apparatus of claim 6, wherein the one or more computer processors are further configured to perform the operation comprising:

transmitting to the sender of the frame a response frame acknowledging receipt of the frame, wherein the frame is discarded by the apparatus.

10. The apparatus of claim 6, wherein the first plurality of memory blocks of the first frame buffer pool comprise 2148-byte memory blocks, and wherein the second plurality of memory blocks of the second frame buffer pool have a larger size than the first plurality of memory blocks.

11. The apparatus of claim 6, wherein the multi-frame sequence of the received frame comprises at least one of a N_Port _ID and Zoning ACL Distribution (NPZD) request sequence and an Active Zoning ACL Distribution (AZAD) request sequence.

* * * * *